US006657972B1

(12) United States Patent
Syed et al.

(10) Patent No.: US 6,657,972 B1
(45) Date of Patent: Dec. 2, 2003

(54) METHOD AND APPARATUS FOR GENERIC FRAME RELAY SERVICES SUPPORT IN A COMMUNICATION NETWORK

(75) Inventors: Sharfuddin Syed, Kanata (CA); Saravanan R. Coimbatore, Nepean (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/418,646

(22) Filed: Oct. 15, 1999

(51) Int. Cl.⁷ .............................................. H04L 12/28
(52) U.S. Cl. ....................................... 370/254; 370/351
(58) Field of Search ................................. 370/522, 498, 370/523, 524, 525, 526, 527, 254, 360, 384, 410, 426, 467, 528

(56) References Cited

U.S. PATENT DOCUMENTS 5,490,252 A  *  2/1996 Macera et al. .............. 709/249
5,758,083 A  *  5/1998 Singh et al. ................. 709/223
6,018,516 A  *  1/2000 Packer ........................ 370/231
6,195,425 B1 *  2/2001 Farris ......................... 379/230
6,272,129 B1 *  8/2001 Dynarski et al. ........... 370/356
6,272,150 B1 *  8/2001 Hrastar et al. ............. 3730/486
6,452,915 B1 *  9/2002 Jorgensen ................... 370/338
2001/0043568 A1 * 11/2001 McHale et al. ............. 370/254
2002/0018473 A1 *  2/2002 Hassell et al. ........... 370/395.1

* cited by examiner

Primary Examiner—Wellington Chin
Assistant Examiner—Jamal A. Fox

(57) ABSTRACT

A method and apparatus for generic support of frame relay services in a communications network is presented. This is accomplished by defining a bit field that indicates whether or not particular functions or services (including frame relay services) are supported by a particular node or other network component. The bit field for each component within the communications network is communicated to the network manager, which stores the bit fields for each component within a database. The database is then utilized to perform network management functions, as it informs the network manager whether a particular service/feature is available on the network component to which the bit field corresponds.

23 Claims, 5 Drawing Sheets

METHOD AND APPARATUS FOR GENERIC FRAME RELAY SERVICES SUPPORT IN A COMMUNICATION NETWORK

FIELD OF THE INVENTION

The invention relates generally to communication systems and more particularly to a method and apparatus for generic frame relay services support in communication systems.

BACKGROUND OF THE INVENTION

Communications networks are evolving rapidly, and network designers are constantly challenged to improve the efficiency, speed, and overall performance of their networks. As such, developers are continuously implementing new communication switches, or nodes, with additional functional capabilities. In order to accurately manage communication networks that include a plurality of nodes, the network manager must understand the functional characteristics of each of the nodes within the network. In prior art systems, such characteristics were typically communicated to the network manager by providing the identity or node-type of the various nodes included in the network to the network manager.

The information communicated to the network manager in prior art systems typically did not include all the functional capabilities that a specific node might possess. It was up to the network manager to determine the functional characteristics for a node based on its node-type or identity. For example, each node of node type X was known to support certain functional characteristics, and the network manager included a reference (often hard-coded in operational software) to node type X that was referenced to determine the functional characteristics of any nodes in the network of node type X. Thus, each time a new node configuration was designed and implemented, the device performing the network management in the communication system would also have to be revised in order to include the functional characteristics for the newly developed nodes. In many cases this caused support of newly developed nodes to be delayed. This delay can be attributed to the time required to make the changes to the network manager, and possibly due to the desire to limit the number of revisions to a particular network management device. In addition to the time delays, revising the network manager adds a risk of interfering with or corrupting the current functionality of the network manager. Quality concerns such as these increase the costs associated with altering the network manager to support the new node technology.

In communications systems that support frame relay services, various nodes in the systems may have varying levels of support for various frame relay services. The support of these services may change for a particular node as subsequent node releases, or versions, are made available. As such, the network manager in the system must be updated to support the various nodes and their various versions. The number of different manufacturers of nodes that support frame relay services compounds the problem as the frame relay functional characteristics of each node available must be understood by the network manager to allow frame relay services to be supported in the network.

Therefore, a need exists for a method and apparatus for supporting frame relay services in a network in a generic manner such that revisions to the network manager are not required each time a new node or new release of an existing node type is developed.

DESCRIPTION OF A PREFERRED EMBODIMENT OF THE INVENTION

Generally, the present invention provides a method and apparatus for generic support of frame relay services in a communications network. This is accomplished by defining a bit field that indicates whether or not particular functions or services (including frame relay services) are supported by a particular node or other network component. The bit field for each component within the communications network is communicated to the network manager, which stores the bit fields for each component within a database. The database is then utilized to perform network management functions, as it informs the network manager whether a particular service/feature is available on the network component to which the bit field corresponds.

By using the bit field to communicate functional characteristics of components within the communications network, the need to revise the network manager each time a new component or new revision of a component is developed is avoided. As long as the new component does not include any functionality not currently supported by the bit field, the component is only required to provide an appropriately configured bit field to the network manager in order to indicate the component's functionality. The network manager does not have to identify the functional characteristics of the particular component using the component type as was the case with prior art systems. As such, newly developed components are immediately supported by the network manager, and updates to any software within the network manager are avoided.

Figure 1:
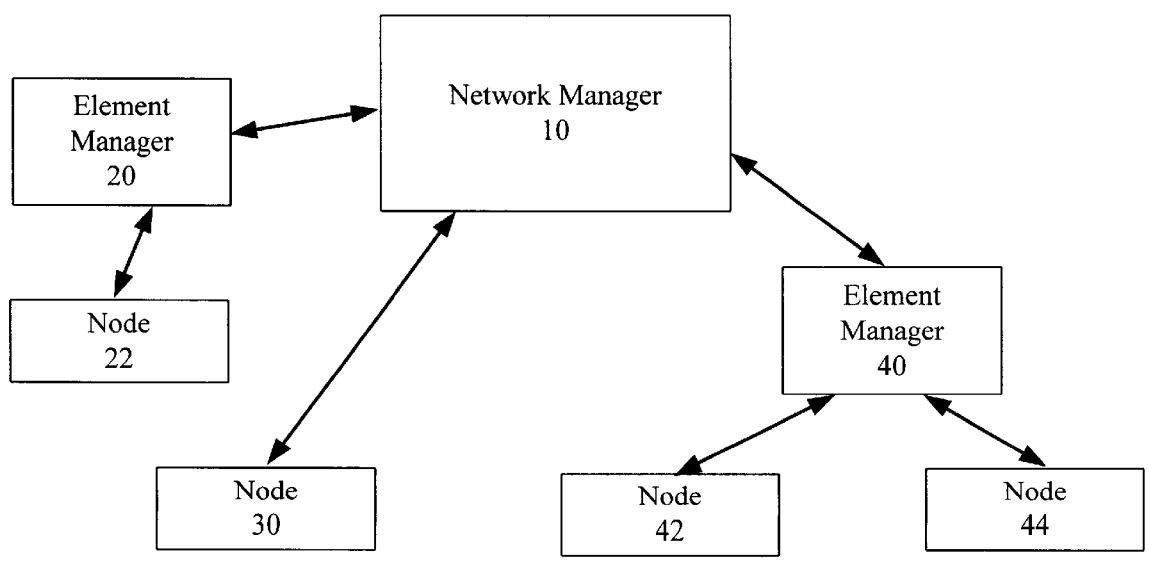
FIG. 1 illustrates a block diagram of a network manager controlling nodes in a network in accordance with the present invention.

The invention can be better understood with reference to FIGS. 1–6. FIG. 1 illustrates a block diagram of a network manager 10 operably coupled to nodes 22, 30, 42 and 44. Preferably, the network manager 10 and the nodes 22, 30, 42 and 44 are included in a communications network that supports frame relay services, and which may include a variety of communications formats, including, but not limited to, time division multiplexing (TDM), asynchronous transfer mode (ATM), and a number of wireless network formats. The nodes 22, 30, 42 and 44 are intercoupled within the network to allow data transmission from a plurality of sources to a plurality of destinations. The general operation of such communication networks are well known in the art.

The nodes 22, 42, and 44 are element managed nodes that require the support of an element manager 20 and 40 to interact with the network manager 10. The manufacturer of these nodes 22, 42, and 44 may be different than the manufacturer of the network manager 10, and the element managers 20 and 40 serve as interfaces to ensure interoperability. The network manager 10 interacts directly with the node 30 without the need for an intervening element manager. The manufacturer of the node 30 may be the same as the manufacturer of the network manager 10 such that a proprietary protocol may be used to support the interaction between the node 30 and the node 10.

The network manager 10, which has a broad view of the components in the network, performs such tasks as creating and connecting frame relay paths that can be routed across multiple nodes. The multiple nodes included in the frame relay paths may be element managed nodes (e.g., nodes 22, 42, and 44) or nodes managed directly by the network manager 10 (e.g., node 30). In order to perform its network management functions, which include establishing frame relay paths, the network manager 10 needs to understand the functional characteristics of the various nodes 22, 30, 42 and 44 within the network. Additional network management functions performed by the network manager 10 can include such functions as determining routing paths in the network for other types of connections, configuring path endpoints in the network, etc.

In prior art solutions, the network manager 10 would receive a model descriptor or some other indication of the identity or node-type of each of the nodes either directly from the node 30, or through an element manager 20, 40 that is operably coupled to the node 22, 42, and 44. In the case where an element manager 20, 40 relays the node type to the network manager 10, the element manager (e.g., manager 20) and the node (e.g., node 22) would typically communicate with each other using Simple Network Management Protocol (SNMP), which is standard protocol that is known in the art. The model descriptor in these prior art solutions did not include functional characteristics of the particular node, but rather would merely identify the type of node. The network manager 10 would then be required to determine all of the functional characteristics for the particular node by the node-type communicated in the model descriptor.

As stated earlier, utilizing the node type to determine functional characteristics can be troublesome when new node types are developed. In order to avoid having to revise the network manager 10 each time new nodes or revisions are developed, a set of indicators, preferably in the form of a bit mapped value, is specified that is used to indicate the functional characteristics for each node in the network. Such functional characteristics include the frame relay services that are supported by each of the nodes. The set of indicators corresponding to each node in the network is provided to the network manager, which builds a database based on the various sets of indicators. This database can then be referenced to perform network management functions such as establishing and configuring frame relay paths.

Figure 2:
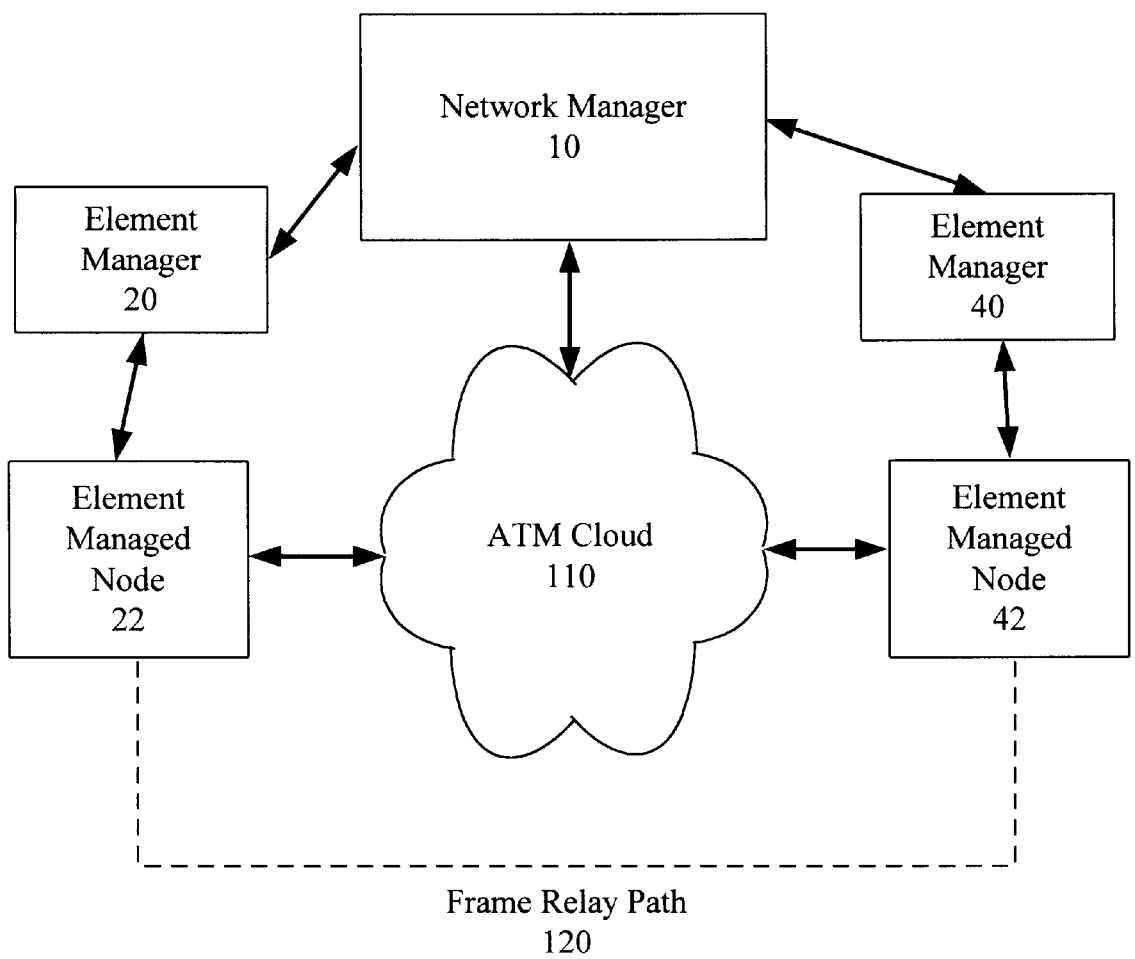
FIG. 2 illustrates a block diagram of a portion of a communications network in which a frame relay path is established in accordance with the present invention.

FIG. 2 illustrates a block diagram of a frame relay path 120 that begins and ends at element managed nodes 22 and 42, respectively. The frame relay path 120 is routed through the ATM cloud 110, which may include a plurality of switches that are intercoupled to permit the transfer of data. The switches, or nodes, within the ATM cloud 110 may be managed directly by the network manager 10.

Creation of the frame relay path 120 typically includes first establishing user to network interface (UNI) frame relay links (FRLs) on both of the element managed nodes 22 and 42. Creation of an FRL on a node results in configuring a frame relay stream on the node. The end-to-end frame relay path is connected by selecting the endpoints of the UNI FRLs. In the case where circuit-based cards are present in the element managed nodes 22 and 42, the frame relay path endpoints are time slots. In the case where aggregate cards are present in the element managed nodes 22 and 44, the frame relay path endpoints are the ports.

The efficiency with which the frame relay path 120 can be routed through the network of FIG. 2 is greatly enhanced by the complete knowledge of the functional capabilities of the various components within the network. By determining these capabilities through the use of bit-mapped indicator sets, simple comparisons between functional capabilities can be performed to determine if a particular node or other network component supports the required functionality for a connection.

When the establishment of the frame relay path 120 is performed in a manner that includes the use of a user interface such as a graphical user interface, the proper functional information regarding the various nodes in the network should be provided to the user. For example, if the user wished to establish the frame relay path 120 as illustrated in FIG. 2, the frame relay services supported by the element managed nodes 22 and 42, which are the endpoints of the path, determine the type of services that may be provided via the frame relay path 120. In prior art systems, the potential functionality of the path 120 was often determined as the superset of the functional capabilities of each of the two endpoints nodes 22 and 42. For example, if the element managed node 22 supports Best Effort and Low Delay frame relay service categories and the element managed node 22 only supports the Best Effort service category, the user interface in prior art system might indicate that both Best Effort and Low Delay services were available on the frame relay path 120. If the user attempted to establish Low Delay service support along the path 120, the endpoint nodes 22 and 42 may try to map the Low Delay service to some similar type of service that was supported, but Low Delay service would not be achieved as it is not supported by the node 22. Therefore, such prior art systems gave the user a false impression that a path that supported Low Delay services had been created or could be created, which was untrue.

Utilizing the bit-mapped indicator sets to relay functional characteristics for each of the nodes in the network provides a straightforward means for comparing functional characteristics of the various nodes. As such, determining the functionality that is supported by two endpoint nodes on a frame relay path is a greatly simplified issue, as the bit mapped values can be quickly and easily compared. This enables the user interface to provide the user with accurate information as to the type of functionality that can be supported over a frame relay path based on the functional characteristics of the end nodes. In the example described immediately above, the user is informed that the endpoint nodes 22 and 42 are both capable of supporting Best Effort services, but the Low Delay service support is not indicated because the node 22 does not support Low Delay services. Therefore, the user interface provides the user with information that more accurately reflects the behavior and capabilities of the nodes in the network.

Figure 3:
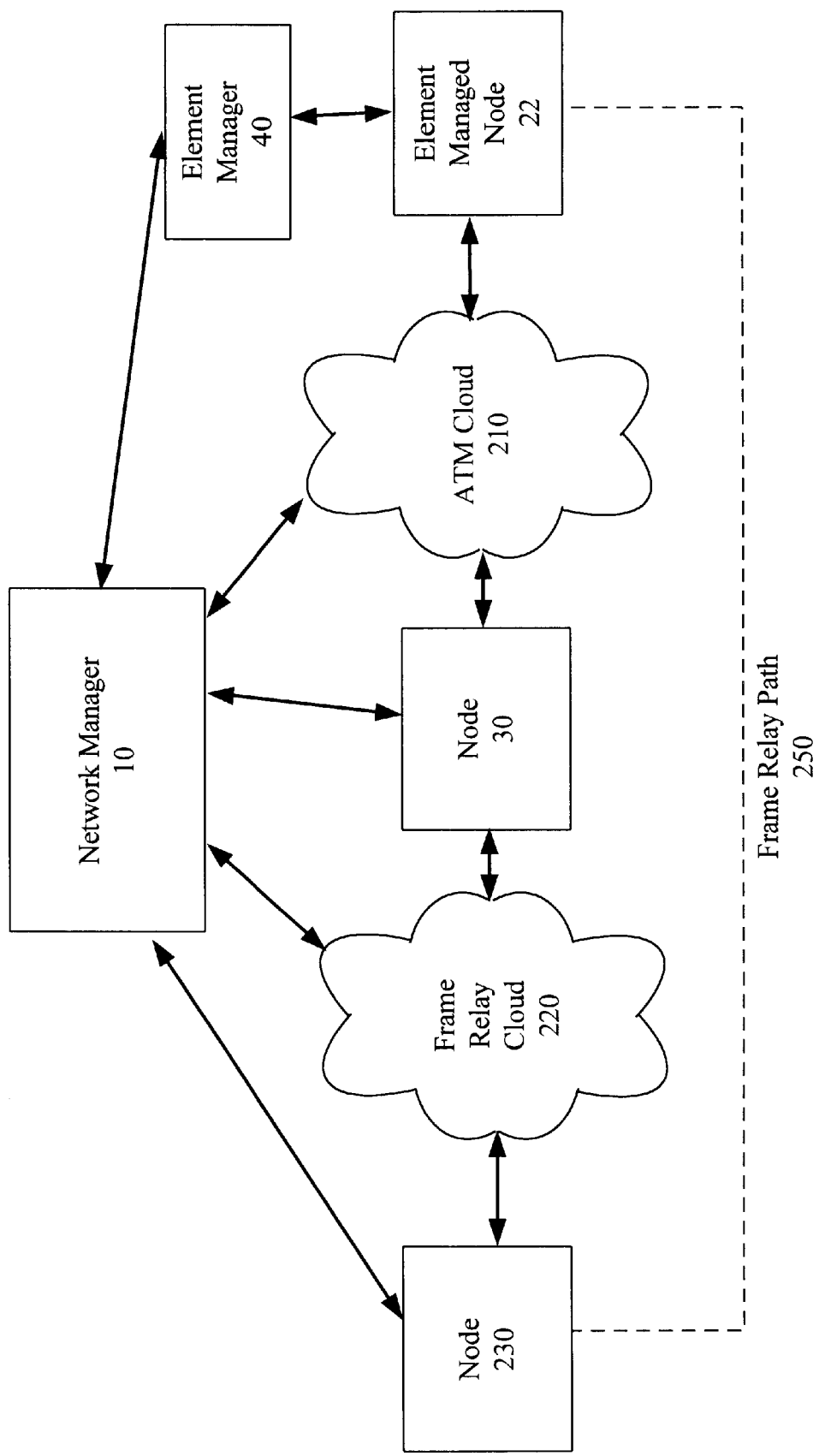
FIG. 3 illustrates a block diagram of another portion of a communications network in which a frame relay path is established in accordance with the present invention.
Figure 4:
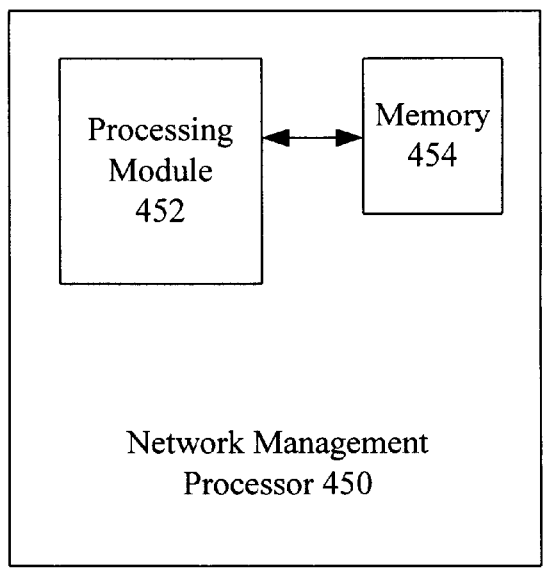
FIG. 4 illustrates a block diagram of a network management processor in accordance with the present invention.

FIG. 3 illustrates a block diagram of a frame relay path 250 that begins at the node 230, which may be directly managed by the network manager 10, and ends at the element managed node 22. The frame relay path 250 is routed through the frame relay cloud 220, the node 30, and the ATM cloud 210. The node 30 along with the nodes within the frame relay cloud 220 and the ATM cloud 210 may be managed directly by the network manager 10.

Creation of the frame relay path 250 occurs in a similar manner to that of the frame relay path 120 of FIG. 2. The functional capabilities of the endpoints of the frame relay path 250 are preferably relayed to a user via a user interface in an accurate manner that does not falsely lead the user to believe that functional capabilities are available when such functionality is not actually supported.

The network manager 10 included in each communication system is preferably coupled to, or includes, a network management processor 450. The network management processor 450 includes a processing module 452 and a memory 454. The processing module 452 may include a single processing entity or plurality of processing entities. Such a processing entity may be a microprocessor, microcontroller, digital signal processor, state machine, logic circuitry, or any device that processes information based on operational or programming instructions.

The memory 454 may be a single memory device or plurality of memory devices. Such a memory device may be a read only device, random access memory device, floppy disk, hard drive memory, or any device that stores digital information. Note that when the processing module 452 has one or more of its functions performed by a state machine or logic circuitry, the memory containing the corresponding operational instructions is embedded within the state machine or logic circuitry.

The memory 454 stores programming or operational instructions preferably corresponding to a network management algorithm. Such operational instructions allow the processing module 452 to perform the methods illustrated in FIGS. 5 and 6. It should be noted that the network management processor 450 may be used in conjunction with additional circuitry such that only portions of the methods of FIGS. 5 and 6 are performed using software, whereas other portions are performed by hardware.

Figure 5:
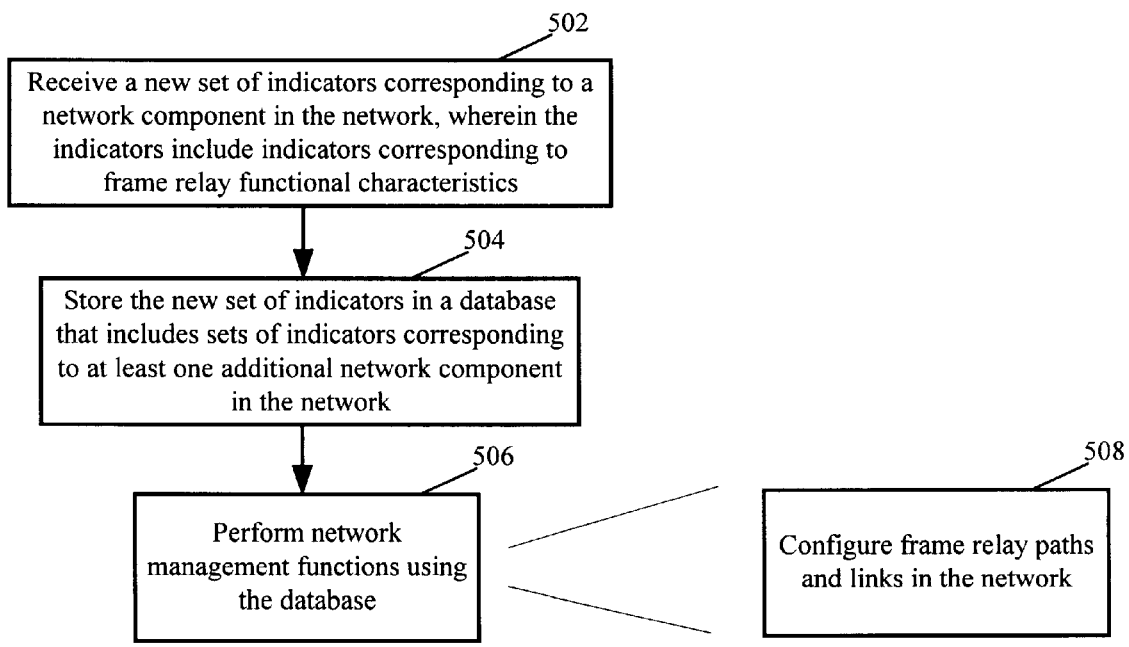
FIG. 5 illustrates a flow diagram of a method for management of a network that supports frame relay services in accordance with the present invention.
Figure 6:
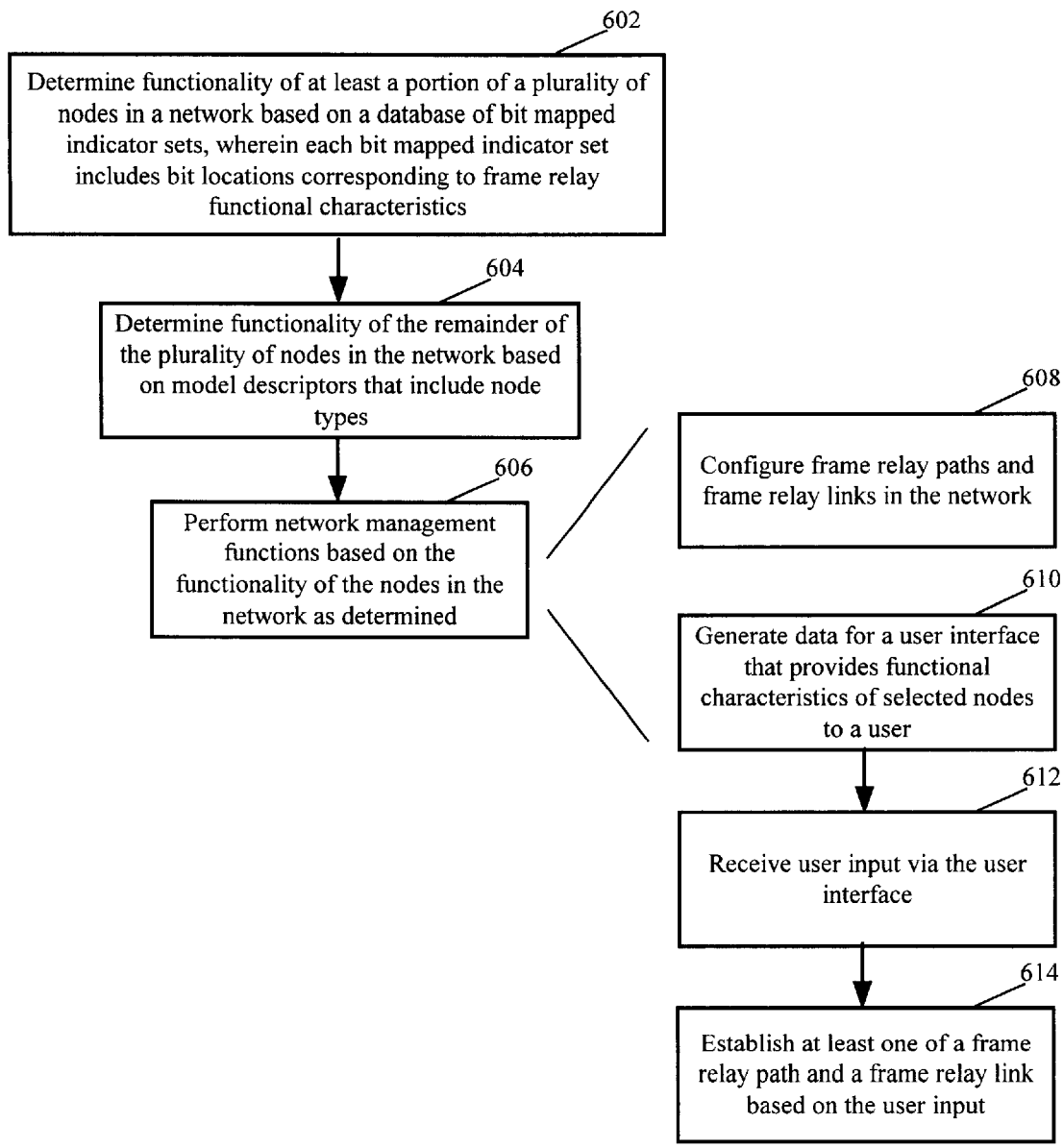
FIG. 6 illustrates a method for constructing a model descriptor in a communications network that supports frame relay services in accordance with the present invention.

FIG. 5 illustrates a flow diagram of a method for management of a network. The method begins at step 502 where a new set of indicators is received corresponding to a network device in the network. The new set of indicators includes functional characteristics of the network device and each indicator of the new set of indicators corresponds to a particular functional characteristic. The set of indicators includes indicators corresponding to the frame relay functional characteristics of the node.

Preferably, each set of indicators includes indicators in a predetermined arrangement where a position in the predetermined arrangement corresponds to representation of a functional characteristic. More preferably, each set of indicators includes a bit mapped value where each bit location in the bit mapped value corresponds to representation of a functional characteristic. Each bit location in the bit mapped value preferably corresponds to a particular functional characteristic, and a bit map template may be used to facilitate such mapping. Note that multiple bit locations may be used in conjunction with a particular functional characteristic. A first bit value (e.g. 0 or 1) indicates that the functional characteristic corresponding to the bit location is supported by a node to which the set of indicators corresponds, whereas the second, or opposite bit value indicates that the functional characteristic is not supported by the node. In one example, if a bit value of 1 is contained in a particular location, the functional characteristic corresponding to that location is supported, whereas a 0 indicates a lack of support for that functional characteristic.

The following table indicates an example bit field that includes a number of services, or properties, that may be supported by a node. Note that this table is merely an example of the potential arrangement of a bit field, and, as is apparent to one of ordinary skill in the art, the arrangement of, and functional characteristics included within, the bit field may be modified as long as the structure and arrangement is understood or consistent throughout the system.

| Bit Position | Bit Field Description/Usage |
|---|---|
| Bit 1 | UNUSED |
| Bit 2 | Node Supports Circuit Emulation |
| Bit 3 | Node Supports ATM |
| Bit 4 | Node Supports SPVC |
| Bit 5 | Node Supports Out of Band SVC Signaling |
| Bit 6 | Node Supports VPTTP |
| Bit 7 | Node Supports admin state |
| Bit 8 | Node Supports Frame Relay |
| Bit 9 | Node Supports Frame Relay Quality of Service |

In addition to the functional characteristics communicated through the bit mapped value or field, a number of other parameters regarding the node may be communicated. Such parameters include basic parameters such as a node number that will be used to identify the node or network element and a plurality of additional node properties, examples of which are detailed in the following list.

| Property Name | Description |
|---|---|
| NODE_FULL_NAME | This property specifies the full name given to a node. |
| NODE_SHORT_NAME | This property specifies a short name to be given to a node. |
| NODE_TYPE | This property specifies the type of the node (.e.g.. Generic node) |
| NODE_SUB_TYPE | This property specifies the node sub type. (e.g. 36140) |
| NODE_TYPE_STR | This property specifies the type name of the node. |
| NODE_SW_GENERIC_NO | Specifies the node software generic. |
| NODE_INTER_NET_ADDR | Specifies the IP address of the node. An example of the format is 123.345.789.123 |
| NODE_STATUS | This property specifies the status of the node. |
| NODE_CONFIG_PROTOCOL | This property specifies the configuration protocol. How to speak to the node. |
| NODE_NO_OF_SHELVES | This property specifies the number of shelves that make up the node. |
| NODE_SLOTS_PER_SHELF | This property specifies how many slots there are per shelf for this node. |
| NODE_MAX_CONN | This property specifies the maximum number of cross-connections supported on the node. |
| NODE_MAX_CDVT_VALUE | Maximum Cell Delay Variance Time. |
| NODE_MAX_MBS_VALUE | Maximum MBS value. |

Within each node a number of shelves, cards, devices, and circuits may be supported, where these entities are listed here in order of hierarchy. Thus, a shelf may include a plurality of cards, each card can include a plurality of devices, etc. Each hierarchical layer includes a list of parameters similar to those listed for a node directly above. In addition, each of these different hierarchical levels has additional functional parameters associated with it, and as such, each instance at each level preferably includes a bit mapped value (set of indicators) in its set of parameters communicated to the network manager that indicates support/non-support of these various features. Preferably, the bit mapped value (set of indicators) for each hierarchical component (e.g. node, shelf, card, device, and circuit) is communicated to the network manager individually. However, as is apparent to one of ordinary skill in the art, the bit mapped values for all of the hierarchical components in a node could be combined in a predetermined, delineated fashion for communication to the network manager such that all of the functional characteristics for the node are communicated to the network manager at once. Partial combinations (e.g. all the bit mapped values for the cards in a particular shelf) could also be used to relay functional information.

The following table indicates an example bit field that includes a number of services, or properties, that may be supported by a device within a node. Once again, the exact ordering of these properties is unimportant as long as consistency or a technique for determining property placement in the bit field is maintained within the system. The list of properties is not meant as an exhaustive list, and additional properties may be included or properties omitted based on the particular system in which the device is present.

| Bit Position | Bit Field Description/Usage |
| --- | --- |
| Bit 1 | UNUSED |
| Bit 2 | Device Supports Circuit Emulation |
| Bit 3 | Device Supports Terminating Vp |
| Bit 4 | Device Supports Terminating Vc |
| Bit 5 | Device does not support non-cross connected Vp |
| Bit 6 | Device does not support non-cross connected Vc |
| Bit 7 | Device does not support cross-connected Vp |
| Bit 8 | Device does not support cross-connected Vc |
| Bit 9 | Device Supports Vp Shaping |
| Bit 10 | Device Supports Vp Continuity |
| Bit 11 | Device Supports Vc Continuity |
| Bit 12 | Device is parent device |
| Bit 13 | Device Supports ATM |
| Bit 14 | Device Supports FR_ATM Cross Connections |
| Bit 15 | Device Supports FR_FR Cross Connections |
| Bit 16 | Device Supports FR Quality of Service |

The following table indicates a number of ATM traffic parameters that may be supported by the device within the node.

| Bit Position | Bit Field Description/Usage |
| --- | --- |
| Bit 2 | Device Supports Tag Policing |
| Bit 3 | Device Supports Tag All Policing |
| Bit 4 | Device Supports Discard Policing |
| Bit 5 | Device Supports Disable Policing |
| Bit 6 | Device Supports epd Policing |
| Bit 7 | Device Supports Frame Discard |
| Bit 8 | Device Supports Frame Pacing |
| Bit 9 | Device Supports 16K Vc Shaping Group |
| Bit 10 | Device Supports 32K Vc Shaping Group |
| Bit 11 | Device Supports 64K Vc Shaping Group |
| Bit 12 | Device Supports 128K Vc Shaping Group |
| Bit 13 | Device Supports 256K Vc Shaping Group |
| Bit 14 | Device Supports 512K Vc Shaping Group |
| Bit 15 | Device Supports 1024K Vc Shaping Group |
| Bit 16 | Device Supports 2048K Vc Shaping Group |
| Bit 17 | Traffic Descriptor - PIR_SIR_0_1 |
| Bit 18 | Traffic Descriptor - PIR_SIR_0 |
| Bit 19 | Traffic Descriptor - PIR_MIR_0_1 |
| Bit 20 | Device Supports Multi Casting |
| Bit 21 | Device Supports Pt to Pt Symmetric Conns |
| Bit 22 | Device Supports Pt to Pt symmetric Conns |

The following table illustrates a number of potential frame relay service categories that may or may not be supported by the device.

| Bit Position | Bit Field Description |
| --- | --- |
| Bit 2 | Device Supports Best Effort |
| Bit 3 | Device Supports Committed Throughput |
| Bit 4 | Device Supports Real Time |
| Bit 5 | Device Supports Low Delay |

The following table illustrates a number of potential ATM service categories that may or may not be supported by the device.

| Bit Position | Bit Field Description |
| --- | --- |
| Bit 2 | Device Supports CBR |
| Bit 3 | Device Supports UBR |
| Bit 4 | Device Supports NRT-VBR |
| Bit 5 | Device Supports RT-VBR |
| Bit 6 | Device Supports ABR |

The following table illustrates a number of potential ATM/Frame Relay interworking parameters that may be supported by the device.

| Bit Position | Bit Field Description |
| --- | --- |
| Bit 2 | Device Supports Network Interworking |
| Bit 3 | Device Supports Service Interworking |
| Bit 4 | Device Supports Link Protocol Type None |
| Bit 5 | Device Supports Link Protocol Type Annex |
| Bit 6 | Device Supports Link Protocol Type User |
| Bit 7 | Device Supports Link Protocol Type Network |
| Bit 8 | Device Supports Protocol Mapping Translated |
| Bit 9 | Device Supports Protocol Mapping Transparent |
| Bit 10 | Device Supports EFCI Mapping EFCI = 0 |
| Bit 11 | Device Supports EFCI Mapping EFCI= FECN |
| Bit 12 | Device Supports Network DE/CLP Mapping: ATM-FR DE = FR-SSCS |
| Bit 13 | Device Supports DE/CLP Mapping: ATM-FR DE = CLP |
| Bit 14 | Device Supports Service DE/CLP Mapping: ATM-FR DE = 0 |
| Bit 15 | Device Supports Service DE/CLP Mapping: ATM-FR DE = 1 |
| Bit 16 | Device Supports DE/CLP Mapping: FR-ATM CLP = 0 |
| Bit 17 | Device Supports DE/CLP Mapping: FR-ATM CLP = 1 |
| Bit 18 | Device Supports DE/CLP Mapping: FR-ATM CLP = DE |

Returning to the flow diagram of FIG. 5, once a new set of indicators corresponding to a network component (node, device that is included within a node, etc.) in the network is received at step 502, the method proceeds to step 504 where the new set of indicators is stored in a database. The database includes sets of indicators corresponding to at least one additional network device in the network. At step 506, the database that includes the new set of indicators is utilized to perform network management functions. Such network management functions can include determining routing paths in the network for calls or connections and configuring path endpoints in the network. Configuring path endpoints can include configuring parameters corresponding to various services listed in the tables provided herein. As is shown at step 508, performing network management functions may also include configuring frame relay paths, frame relay path endpoints, and frame relay links within the network. Additional frame relay services support can also be performed based on the frame relay functional parameters relayed through the indicator sets corresponding to the components in the network.

In order to convey the set of indicators corresponding to each node in the network to the network manager, a model descriptor for each node may be generated. Prior art model descriptors did not include functional characteristics, but did include the node type such that the network manager would be able to ascertain functionality of the node based on its node type. Therefore, in order to generate a model descriptor that includes the functional characteristics of a particular node, the functional characteristics for the node must first be determined. Based on the functional characteristics, which preferably include frame relay characteristics, a set of indicators corresponding to these functional characteristics can be generated. Thus, a bit mapped value for the particular node (or hierarchical component included in a node) can be established where certain bits are set to a positive state to indicate support of certain functional characteristics. As before, each indicator of the set of indicators (each bit within the bit mask) corresponds to a particular functional characteristic. This was illustrated with specific, detailed examples in the tables included above. Generating the set of indicators preferably includes generating the indicators based on a bit mapped template used by the network management device. The set of indicators may then be combined with any physical characteristic information (also provided above with respect to a node) of the node to produce the model descriptor.

By utilizing bit mapped values to ascertain functionality within a node, the functional characteristics of the node can be understood without modifying current decision-making algorithms within the network management device. As such, when new nodes, or switches, are brought to market, network managers will be able to support the new nodes without the need for revision of the network managers.

FIG. 6 illustrates a flow diagram of a method for performing network management functions in a communication network that includes a plurality of nodes. At step 602, the functionality of at least a portion of the plurality of nodes (and possibly also the functionality of the hierarchical component entities included in the portion of the plurality of nodes) is determined based on a database of bit mapped indicator sets. Each bit mapped indicator set may include bit locations that correspond to frame relay functional characteristics. Each node that is included in the database has a corresponding bit mapped indicator set that indicates functional characteristics for that node. Any newly developed node for use in the network should be capable of supporting such types of bit is mapped indicator sets.

At step 604, older or non-conforming nodes included in the network that do not support the bit mapped indicator sets will be supported. In order to determine the functionality for these nodes, the device or node type (which may be included in a model descriptor) is utilized to ascertain the functional characteristics of the node. Because the prior art network managers already support the current set of nodes that do not support the bit mapped indicator sets, additional revisions to the network manager (once new nodes conform to the bit mapped indicator sets) will not be required.

At step 606, network management functions are performed based on functionality of the plurality of nodes as determined at steps 602 and 604. Note that the network management functions that may be performed can vary greatly, and any network function that depends on functional characteristics of the various nodes in the network may be performed using the information included in the database. At step 608, network management functions are shown to include configuring frame relay paths and frame relay links within the network.

At step 610, data for a user interface is generated based on the database information, where the user interface provides functional characteristics of the network components (nodes, shelves, cards, etc.) to the user. At step 612, user input is received from the user via the user interface. The user input could include configuration requests with respect to a frame relay path such that the services that the user desires will be implemented on the frame relay path within the network. At step 614, a frame relay path or frame relay link is configured based on the user input. Thus, the user receives accurate information regarding the functional characteristics of the network and makes informed decisions that are then acted upon to configure the network based on the wishes of the user.

Thus, by relying on the database of bit mapped indicator sets to provide the functionality of at least a portion of the nodes in the network and determining functionality of the remaining nodes in the network based on their node type, functional characteristics of all the nodes in the network can be ascertained and utilized to perform the network management functions, including those which support frame relay services, in a more efficient manner than was possible using prior art systems.

It should be understood that the implementation of other variations and modifications of the invention and its various aspects should be apparent to those of ordinary skill in the art, and that the invention is not limited to the specific embodiments described. It is therefore contemplated to cover by the present invention, any and all modifications, variations, or equivalents that fall within the spirit and scope of the basic underlying principles disclosed and claimed herein.

What is claimed is:

1. A method for management of a network that supports frame relay services, comprising:

receiving a new set of indicators corresponding to a selected network component in the network, wherein the new set of indicators includes frame relay functional characteristics of the selected network component, wherein each indicator of at least a portion of the new set of indicators corresponds to a particular frame relay functional characteristic;

storing the new set of indicators in a database, wherein the database includes sets of indicators corresponding to at least one additional network component in the network; and utilizing the database including the new set of indicators to perform network management functions that include frame relay services.

2. The method of claim 1, wherein each set of indicators includes indicators in a predetermined arrangement, wherein position in the predetermined arrangement corresponds to representation of a functional characteristic, wherein at least a portion of positions in the predetermined arrangement correspond to frame relay functional characteristics.

3. The method of claim 2, wherein each set of indicators further comprises a bit mapped value, wherein each bit location in the bit mapped value corresponds to representation of a functional characteristic.

4. The method of claim 1, wherein each set of indicators includes indicators indicating functional characteristics of a corresponding network component, wherein network components included in the network include at least one of nodes, shelves, cards, ports, and circuits.

5. The method of claim 1, wherein the set of indicators further includes physical characteristics of the network component.

6. The method of claim 1, wherein performing network management functions further comprises determining frame relay routing paths in the network.

7. The method of claim 1, wherein performing network management functions further comprises configuring frame relay path endpoints in the network.

8. The method of claim 1, wherein the network is a communications network that includes, in additional to frame relay format network components, one or more of Time Division Multiplexing, asynchronous transfer mode, and wireless network formats.

9. A method for constructing a model descriptor for a network component in a communications network that supports frame relay services, comprising:
   determining functional characteristics for the network component, wherein the functional characteristics include frame relay service functional characteristics;
   generating a set of indicators corresponding to the functional characteristics, wherein each indicator of the set of indicators corresponds to a particular functional characteristic; and
   combining the set of indicators with physical characteristic information of the network component to produce the model descriptor.

10. The method of claim 9, wherein generating the set of indicators further comprises generating a bit mapped set of indicators, wherein each bit of the bit mapped set corresponds to a functional characteristic.

11. The method of claim 10, wherein generating the set of indicators further comprises generating the set of indicators based on a bit map template used by a network management device in the communications network.

12. A method for performing network management functions in a communications network that includes a plurality of nodes, wherein the communications network supports frame relay services, comprising:
   determining functionality of at least a portion of the plurality of nodes based on a database of bit mapped indicator sets, wherein each node of the at least a portion of the nodes in the communications network is represented by corresponding bit mapped indicator set, wherein each bit mapped indicator set indicates functional characteristics for a corresponding node, wherein each bit mapped indicator set includes bit locations corresponding to frame relay functional characteristics;
   when functionality of the plurality of nodes is not fully characterized by the database, determining functionality of a remainder portion of the plurality of nodes based on a node type included in each of the model descriptors corresponding to nodes included in the remainder portion of the plurality of nodes; and
   performing network management functions based on functionality of the plurality of nodes as determined, wherein the network management functions include frame relay network management functions.

13. The method of claim 12, wherein performing network management functions further comprises determining frame relay routing paths in the communications network.

14. The method of claim 12, wherein performing network management functions further comprises generating data for a user interface, wherein the user interface provides functional characteristics of selected nodes in the network to a user.

15. The method of claim 14 further comprises:
   receiving user input via the user interface; and
   establishing at least one of a frame relay path and a frame relay link based on the user input.

16. The method of claim 14, wherein generating data for a user interface further comprises generating the data for the user interface that reflects frame relay capabilities of nodes in the communications network as determined from the functionality of the plurality of nodes.

17. A network management processor that supports frame relay services in a communication network, comprising:
   a processing module; and
   memory operably coupled to the processing module, wherein the memory includes operating instructions that cause the processing module to:
     store a received new set of indicators in a database, wherein the new set of indicators corresponds to a selected network component in the communication network, wherein the database includes indicators corresponding to at least one additional network component in the communication network, wherein the new set of indicators includes frame relay functional characteristics of the selected network component, wherein each indicator at least a portion of the new set of indicators corresponds to a particular frame relay functional characteristic; and
     perform network management functions based on the database including the new set of indicators, wherein the network management functions include functions related to frame relay services.

18. The network management processor of claim 17, wherein each set of indicators includes indicators in a predetermined arrangement, wherein position in the predetermined arrangement corresponds to representation of a functional characteristic, wherein at least a portion of positions in the predetermined arrangement correspond to frame relay functional characteristics.

19. The network management processor of claim 18, wherein each set of indicators further comprises a bit mapped value, wherein each bit location in the bit mapped value corresponds to representation of a functional characteristic.

20. The network management processor of claim 17, wherein each set of indicators includes indicators indicating functional support of a corresponding network component, wherein network components included in the communication network include at least one of nodes, shelves, cards, ports, and circuits.

21. The network management processor of claim 17, wherein performing network management functions further comprises configuring at least one of frame relay paths and frame relay links in the communication network.

22. A network management processor for performing network management functions in a communications network that includes a plurality of nodes, wherein the communications network supports frame relay services, comprising:

a processing module; and memory operably coupled to the processing module, wherein the memory includes operating instructions that cause the processing module to:

determine functionality of at least a portion of the plurality of nodes based on a database of bit mapped indicator sets, wherein the at least a portion of the nodes in the communications network are represented by corresponding bit mapped indicator sets, wherein each bit mapped indicator set indicates functional characteristics for a corresponding node, wherein each bit mapped indicator set includes bit locations corresponding to frame relay functional characteristics;

when functionality of the plurality of nodes is not fully characterized by the database, determine functionality of a remainder portion of the plurality of nodes based on a node type included in each of the model descriptors corresponding to nodes included in the remainder portion of the plurality of nodes; and perform network management functions based on functionality of the plurality of nodes as determined, wherein the network management functions include frame relay network management functions.

23. The network management processor of claim 22, wherein performing network management functions further comprises determining frame relay routing paths in the communications network.

* * * * *